(12) United States Patent
King, V et al.

(10) Patent No.: US 10,708,316 B2
(45) Date of Patent: Jul. 7, 2020

(54) VIRTUAL BORDER CONTROLLER

(71) Applicant: Subspace Inc., Seattle, WA (US)

(72) Inventors: William Emmett King, V, Seattle, WA (US); Bayan William Towfiq, Seattle, WA (US)

(73) Assignee: Subspace Inc., Seattle, WA (US)

( * ) Notice: Subject to any disclaimer, the term of this patent is extended or adjusted under 35 U.S.C. 154(b) by 82 days.

(21) Appl. No.: 16/112,822

(22) Filed: Aug. 27, 2018

(65) Prior Publication Data

US 2019/0068654 A1 Feb. 28, 2019

Related U.S. Application Data

(60) Provisional application No. 62/551,183, filed on Aug. 28, 2017.

(51) Int. Cl.
| | |
|---|---|
| *H04L 29/06* | (2006.01) |
| *H04L 12/46* | (2006.01) |
| *H04L 12/725* | (2013.01) |
| *H04L 29/08* | (2006.01) |
| *H04L 12/803* | (2013.01) |

(52) U.S. Cl.
CPC ...... *H04L 65/1069* (2013.01); *H04L 12/4641* (2013.01); *H04L 45/3065* (2013.01); *H04L 65/1089* (2013.01); *H04L 67/1002* (2013.01); *H04L 47/125* (2013.01); *H04L 63/1458* (2013.01); *H04L 65/608* (2013.01)

(58) Field of Classification Search
CPC ............. H04L 65/1069; H04L 65/1089; H04L 65/608; H04L 67/1002; H04L 63/1458; H04L 12/4641
USPC ........................................................ 709/219
See application file for complete search history.

(56) References Cited

U.S. PATENT DOCUMENTS

| | | | |
|---|---|---|---|
| 2014/0267569 A1* | 9/2014 | Periyannan | H04N 7/148 348/14.08 |
| 2016/0219024 A1* | 7/2016 | Verzun | H04L 9/34 |

* cited by examiner

*Primary Examiner* — Tauqir Hussain
(74) *Attorney, Agent, or Firm* — Rowan TELS LLC

(57) ABSTRACT

A method comprising receiving a media signal from a media source at one of one or more media signal receivers, determining an association between the media source and the one of the one or more media signal receivers, sending the association to a state control memory structure, determining one of one or more media signal transmitters associated with a media destination, and sending the first media signal to the media destination utilizing the one of the one or more media signal transmitters associated with the media destination. As a media source may be further utilized as a media destination, the association is utilized to determine the one of the one or more media signal transmitters.

6 Claims, 9 Drawing Sheets

```
                            ┌──────────────────────────┐
                            │ A FIRST VIRTUAL MACHINE (ONE OF │
                            │ A PLURALITY OF INSTANCES) WITH  │
                            │ THE SAME IP ADDRESS RECEIVES    │
                            │        TRAFFIC 802              │
                            └──────────────┬───────────┘
                                           ▼
                            ┌──────────────────────────┐
                            │   A SECOND VIRTUAL MACHINE      │
                            │ STARTS RECIEVING THE TRAFFIC THAT│
                            │ WAS ORIGINALLY ROUTED TO THE    │
                            │   FIRST VIRTUAL MACHINE 804     │
                            └──────────────┬───────────┘
                                           ▼
                            ┌──────────────────────────┐
                            │    SECOND VIRTUAL MACHINE       │
                            │ GENERATES A STATE CHANGE EVENT  │
                            │ NOTIFYING THE SYSTEM THAT IT IS │
                            │ NOW RECEIVING THE TRAFFIC FOR   │
                            │ WHICH IT WAS PROVISIONED 806    │
                            └──────────────┬───────────┘
                                           ▼
                            ┌──────────────────────────┐
                            │ CHECK NETWORK TO SEE IF MANY    │
                            │ CALLS ARE BEING ROUTED TO THE   │
                            │ SECOND VIRTUAL MACHINE INSTEAD  │
                            │ OF THE INTENDED FIRST VIRTUAL   │
                            │        MACHINE 808              │
                            └──────────────────────────┘
```

FIG. 8

VIRTUAL BORDER CONTROLLER

CROSS-REFERENCE TO RELATED APPLICATIONS

This application claims benefit under 35 U.S.C. 119 to U.S. application Ser. No. 62/551,183, entitled "Virtual Border Controller", filed on Aug. 28, 2017, and incorporated herein by reference in its entirety.

BACKGROUND

Transmittal of media may occur over one or more networks. Often internal networks may provide more opportunity to increase the speed and reliability of the media transmission through network optimization. This increases when multiple media transmissions are occurring. However, the speed and reliability of the overall transmission may be limited by transmitting the media from a device or server to the internal network (or internal network to the device or server). Thus, there is a need for a method and system that minimizes the transmission time over non-internal networks.

BRIEF SUMMARY

A system is disclosed to enable a media source to send to any of multiple access points (e.g., receivers) to the internal network. The media source may utilize anycast to determine the access point to which to transmit. Thus, a non-optimal or denied access point may not be utilized by the media source. The system then generates an association between the media source and the access point. When media is sent to the media source, the system may utilize the association to route media from one access point to another via the internal network, resulting in an efficient transfer from source to the first access point, over the internal network from the first access point to the second access point, and from the second access point to the destination. The system further updates the association when a new access point is utilized by a source. When that source is utilized as a destination, the new association, and thus access point, is utilized. As the internal network may comprise multiple networks, the system may be utilized at the edge of each network.

Decreasing the time that the transmission is not on the internal network may increase the overall transmission speed. Additionally, providing internal network access flexibility may decrease the effectiveness of a Denial-of-Service attack.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 8 illustrates a method 800 in accordance with one embodiment.

DETAILED DESCRIPTION

Figure 1:
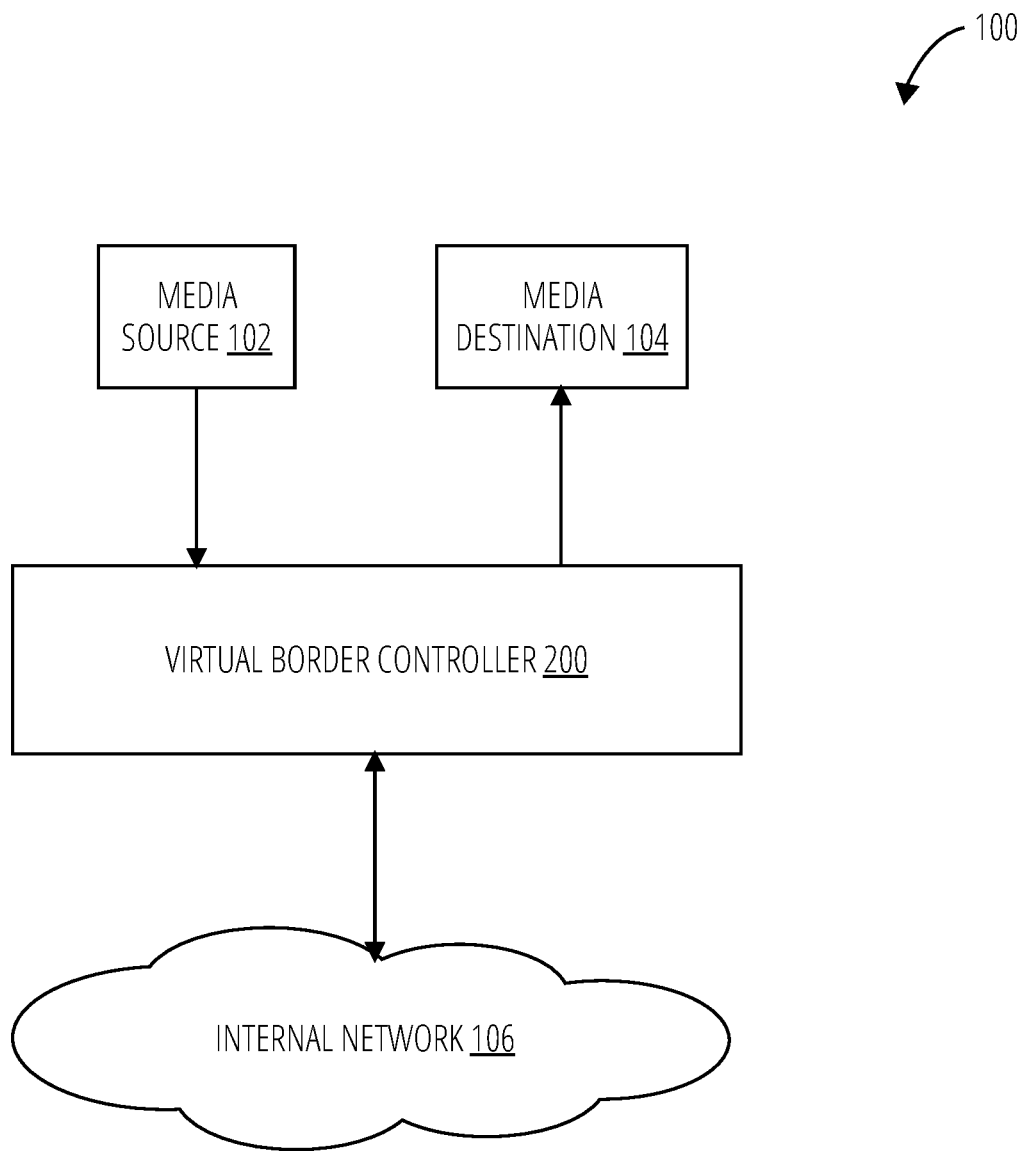
FIG. 1 illustrates an embodiment of an operating environment 100.

Terminology used herein should be accorded its ordinary meaning in the art unless otherwise indicated expressly or by context.

"Association" refers to a signal identifying a media source and a media signal receiver.

"Identifying information" refers to IP addresses, ports, etc. utilized to determine a specific device in a communication network.

"Media destination" refers to a device or server capable of receiving a media signal.

"Media signal" refers to a structured communication that conveys information about the behavior or attributes of computerized media, such as audio, video, speech, image, etc.

"Media source" refers to a device or server capable of sending a media signal.

"Media signal receiver" refers to an access point to a network that receives a media signal from a media source.

"Media signal transmitter" refers to an access point to a network that sends a media signal to a media destination.

"Circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" refers to software logic embodied as processor-executable instructions stored in read-only memories or media.

"Hardware" refers to logic embodied as analog or digital circuitry.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" refers to logic implemented as processor-executable instructions in a machine memory (e.g. read/write volatile or nonvolatile memory or media).

"Anycast" refers to a network addressing and routing methodology in which a single destination address has multiple routing paths to two or more endpoint destinations.

"Tunneling protocol" refers to a communications protocol that allows for the secure (encrypted) movement of data from one network to another.

"Encapsulation" refers to a method of designing modular communication protocols in which logically separate functions in the network are abstracted from their underlying structures by inclusion or information hiding within higher level objects. During encapsulation, each layer builds a protocol data unit (PDU) by adding a header, and sometimes a trailer, containing control information to the PDU from the layer above.

"Provisioning" refers to the process of preparing and equipping a network to allow it to provide new services to its users.

"Virtual machine" refers to an emulation of a computer system. Virtual machines (VM) may be based on computer architectures and provide the functionality of a physical computer.

"Associator" refers to a correlator (see the definition for correlator).

"Comparator" refers to a logic element that compares two or more inputs to produce one or more outputs that reflects similarity or difference of the inputs. An example of a hardware comparator is an operational amplifier that outputs a signal indicating whether one input is greater, less than, or about equal to the other. An example software or firmware comparator is: if (input1==input2) output=val1; else if (input1>input2) output=val2; else output=val3; Many other examples of comparators will be evident to those of skill in the art, without undo experimentation.

"Correlator" refers to a logic element that identifies a configured association between its inputs. One examples of a correlator is a lookup table (LUT) configured in software or firmware. Correlators may be implemented as relational databases. An example LUT correlator is: |low_alarm_condition|low_threshold_value|0| |safe_condition|safe_lower_bound|safe_upper_bound| |high_alarm_condition|high_threshold_value| 0|. Generally, a correlator receives two or more inputs and produces an output indicative of a mutual relationship or connection between the inputs. Examples of correlators that do not use LUTs include any of a broad class of statistical correlators that identify dependence between input variables, often the extent to which two input variables have a linear relationship with each other. One commonly used statistical correlator is one that computes Pearson's product-moment coefficient for two input variables (e.g., two digital or analog input signals). Other well-known correlators compute a distance correlation, Spearman's rank correlation, a randomized dependence correlation, and Kendall's rank correlation. Many other examples of correlators will be evident to those of skill in the art, without undo experimentation.

"Network" refers to a collection of terminal nodes, links are connected so as to enable telecommunication between the terminals. The transmission links connect the nodes together. The nodes use circuit switching, message switching or packet switching to pass the signal through the correct links and nodes to reach the correct destination terminal.

"Selector" refers to a logic element that selects one of two or more inputs to its output as determined by one or more selection controls. Examples of hardware selectors are multiplexers and demultiplexers. An example software or firmware selector is: if (selection_control==true) output=input1; else output=input2; Many other examples of selectors will be evident to those of skill in the art, without undo experimentation.

"Switch" refers to logic to select one or more inputs to one or more outputs under control of one or more selection signals. Examples of hardware switches are mechanical electrical switches for switching power to circuits, devices (e.g., lighting), or motors. Other examples of hardware switches are solid-state switches such as transistors. An example of a hardware or firmware switch is: if (selection==true) output=input; else output=0. A somewhat more complicated software/firmware switch is: if (selection1==true and selection2==true) output=input1; else if (selection1==true and selection2==false) output=input2; else if (selection1==false and selection2==true) output=input3; else output=noOp. Switches operate similarly to selectors in many ways (see the definition of Selector), except in some cases switches may select all inputs to the output, (s) not select among inputs. Other examples of switches will be readily apparent to those having skill in the art, without undo experimentation.

Referring to FIG. 1, the operating environment 100 comprises a media source 102, a media destination 104, an internal network 106, and a virtual border controller 200.

The media source 102 sends a media signal to the virtual border controller 200. The media source 102 may utilize protocols, such as Transmission Control Protocol (TCP), Stream Control Transmission Protocol (SCTP), User Datagram Protocol (UDP), or tunneling protocols. The media source 102 may also use segmented routing (SR). The media source 102 may receive an anycast Internet Protocol (IP) address from the virtual border controller 200 during setup of the connection to the virtual border controller 200. The media source 102 then utilizes the anycast address to connect to the virtual border controller 200. In some embodiments, the media source 102 may be a media destination as well.

SR may include tunneling technology that encapsulates a packet within a header, and forwards the packet based on the encapsulating header. Tunneling protocols may be used, such as layer 2 Tunneling Protocol (L2TP), Point to Point Tunneling Protocol (PPTP), and Layer 2 Forwarding (L2F). These tunneling protocols may allow private network communications to be sent across a public network through encapsulation. SR may also include traffic engineering technology that allows a router to steer traffic along a segmented routing path.

The media destination 104 receives the media signal from the virtual border controller 200. The media destination 104 may utilize protocols, such as TCP, SCTP, UDP, or tunneling protocols. The media destination 104 may also utilize SR. The media destination 104 may receive an anycast IP address (e.g., 1.1.1.1:12345) from the virtual border controller 200 during setup of the connection to the virtual border controller 200. The media destination 104 then utilizes the anycast address to connect to the virtual border controller 200. In some embodiments, the media destination 104 may be a media source as well.

The internal network 106 may receive and send the media signal to the virtual border controller 200. The internal network 106 provides a route between the components of the virtual border controller 200. The internal network 106 may determine an optimal route between two components for a specific media signal.

Figure 2:
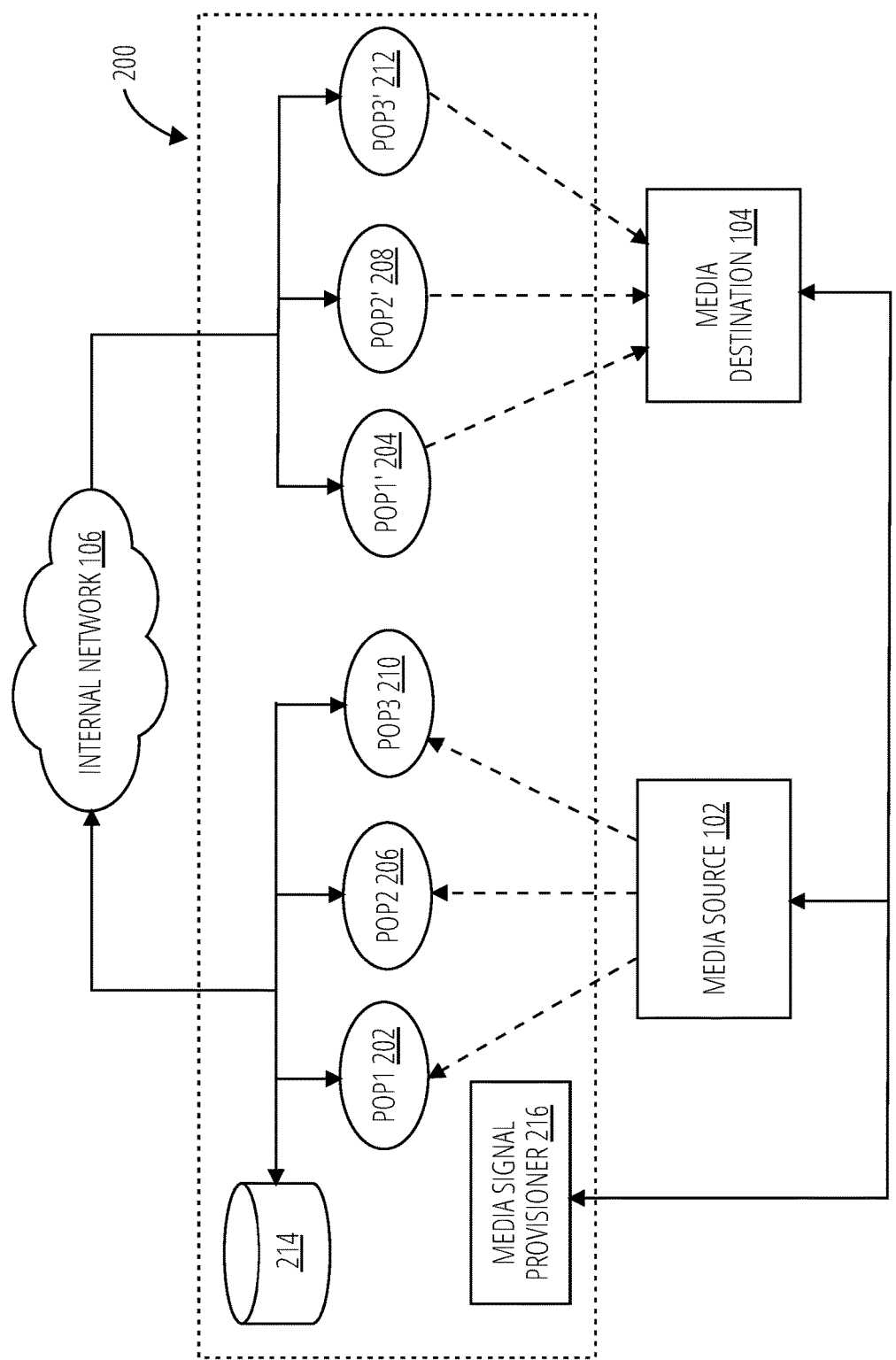
FIG. 2 illustrates an embodiment of a virtual border controller 200.

The virtual border controller 200 is depicted in FIG. 2. The virtual border controller 200 receives the media signal from the media source 102 at one component, routes the media signal to a second component via the internal network 106, and sends the media signal to the media destination 104.

The resulting network control system increases the performance and efficiency of routing and delivering a media signal to a final destination. Additionally, the length of time the media signal travels outside of the internal network may be minimized, thereby increasing the efficiency of the delivery of the media signal to a final destination. Traffic may be routed with negligible latency to a user using the anycast system resulting in a performance improvement experienced in the user. Further, there is service reliability due to redundant servers. If the server routing a user's content goes down, the service is automatically routed to the server with the next best route. Additionally, the system may allow for more effective load balancing. If the media signals from a provider are routed to multiple servers, this may balance the load among the servers and thus improve the effective speed of the transfers. Further, if there is a denial of service (DoS) attack, only a localized portion of the network may be affected, thus allowing other servers to handle the media delivery. Also, providing internal network access flexibility may assist in minimizing the effectiveness of a DoS attack.

Referring to FIG. 2, the virtual border controller 200 comprises a first media signal receiver 202, a first media signal sender 204, a second media signal receiver 206, a second media signal sender 208, a third media signal receiver 210, a third media signal sender 212, a state control memory structure 214, and a media signal provisioner 216.

A media source 102, a media destination 104, an internal network 106 may interact with the virtual border controller 200 as described in FIG. 1.

The first media signal receiver 202, the second media signal receiver 206, and the third media signal receiver 210 receive media signals from the media source 102. Each of the first media signal receiver 202, the second media signal receiver 206, and the third media signal receiver 210 may represent different geographic locations. As the media source 102 may be utilizing anycast as discussed in FIG. 1, one of the first media signal receiver 202, the second media signal receiver 206, and the third media signal receiver 210 receives a specific media signal. The media signal receiver then determines whether the receipt of the media signal is a state change. A state change may occur when the media source 102 sends the media signal to a different media signal receiver (e.g., send to first media signal receiver 202, then to second media signal receiver 206). The media signal receiver may also receive the current state from the state control memory structure 214 and compare the media source 102 to the current state. The media signal receiver may also determine a state change by sending a query control to the state control memory structure 214 to receive the current stored state. If a state change is determined, the media signal receiver sends an update signal to the state control memory structure 214. The first media signal receiver 202, the second media signal receiver 206, and the third media signal receiver 210 are associated with the first media signal sender 204, the second media signal sender 208, and the third media signal sender 212, respectively. If a media source 102 is also utilized as a media destination, then the media signal sender associated with the media signal receiver is utilized to send the media signal, based on the state stored in the state control memory structure 214. The first media signal receiver 202, the second media signal receiver 206, and the third media signal receiver 210 sends the media signal to the internal network 106, to further send the media signal to the media signal sender associated with the media destination 104.

The first media signal sender 204, the second media signal sender 208, and the third media signal sender 212 receive media signals from the internal network 106 and send the media signals to the media destination 104. The media signal sender utilized to send the media signal to the media destination 104 may be based on whether the media destination 104 has sent a media signal and, therefore, has a state stored in the state control memory structure 214. If so, the media signal sender associated with the media signal receiver stored in the state control memory structure 214 is utilized. If the media destination 104 has not sent a media signal, the media signal sender may be selected by random selection, by utilizing a media signal sender that has sent media signals to similarly situated media destinations (e.g., location, IP address, media signal characteristics, etc.), or by utilizing the media signal sender associated with the media signal receiver utilized by the media source 102. In some embodiments, the media signal sent to the media destination 104 may further include instructions for the media destination 104 to send a media signal, or other signal to one of the media signal receivers to generate an associated media signal sender.

The state control memory structure 214 may store the associations between the media signal receivers and the media signal senders, as well as the associations between each media source 102 and the media signal receiver to which each media source 102 is sending a media signal. The state control memory structure 214 may send to each media signal receiver in response to receiving an update signal from one of the media signal receivers, or may send to a media signal receiver in response to a query control. The state control memory structure 214 may utilize Session Initiation Protocol (SIP) to send the state to each media signal receiver. The state control memory structure 214 may store the identifying information associated with the media source 102 and the media destination 104 such as IP addresses, sub-network address (e.g., /24), etc., which may be determined from the media signal received from the media signal receiver.

The media signal provisioner 216 may receive a setup signal from a media source 102 or a media destination 104 and in response send a provision signal to the media source 102 or the media destination 104 to send or receive media signals from the media signal receivers or the media signal senders. The signal may provide an anycast IP address.

Figure 6:
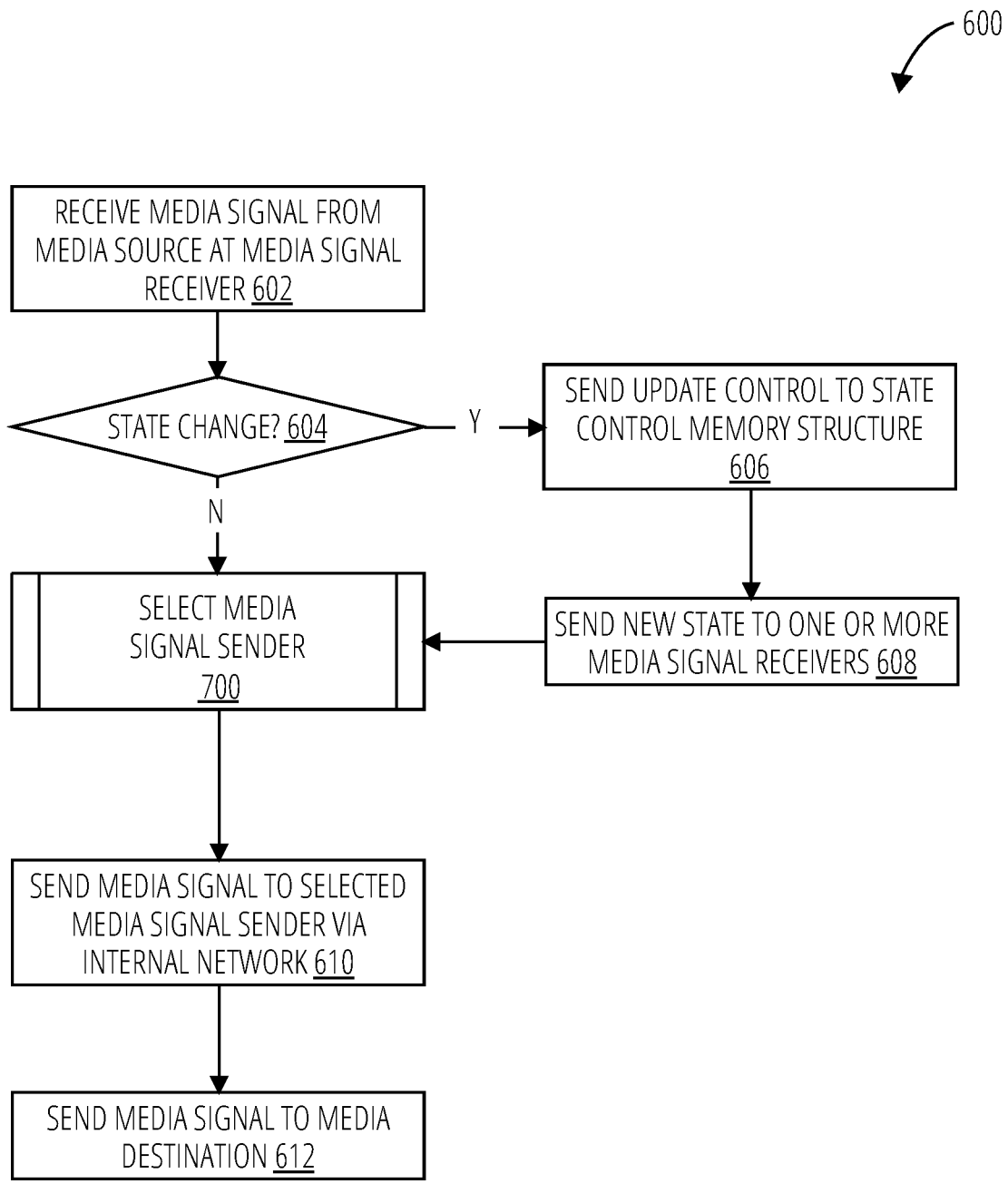
FIG. 6 illustrates an embodiment of a media signal transmitting process 600.
Figure 7:
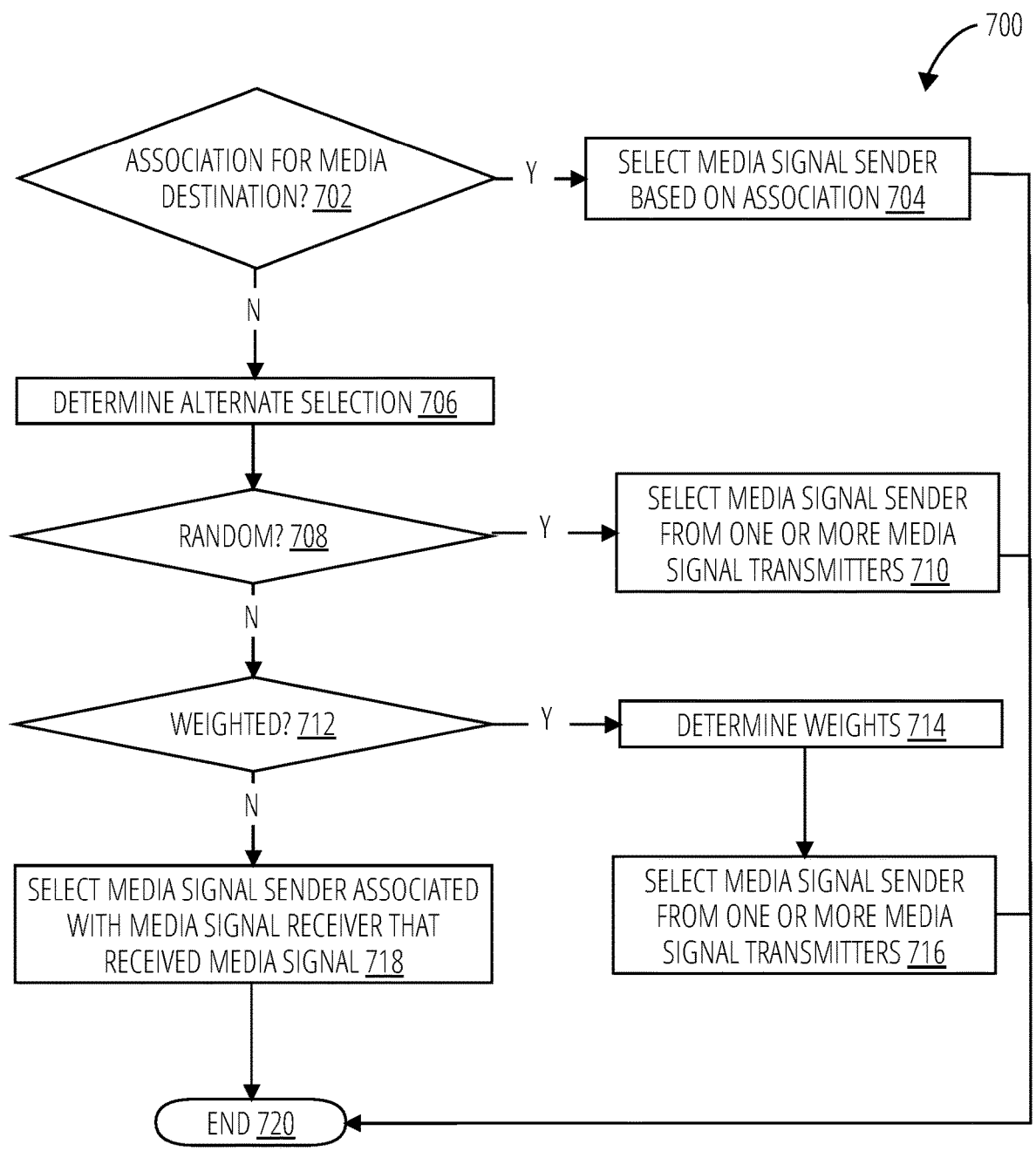
FIG. 7 illustrates an embodiment of a media signal sender selection method 700.

The virtual border controller 200 may be operated in accordance with the process depicted in FIG. 6 and FIG. 7.

Figure 3:
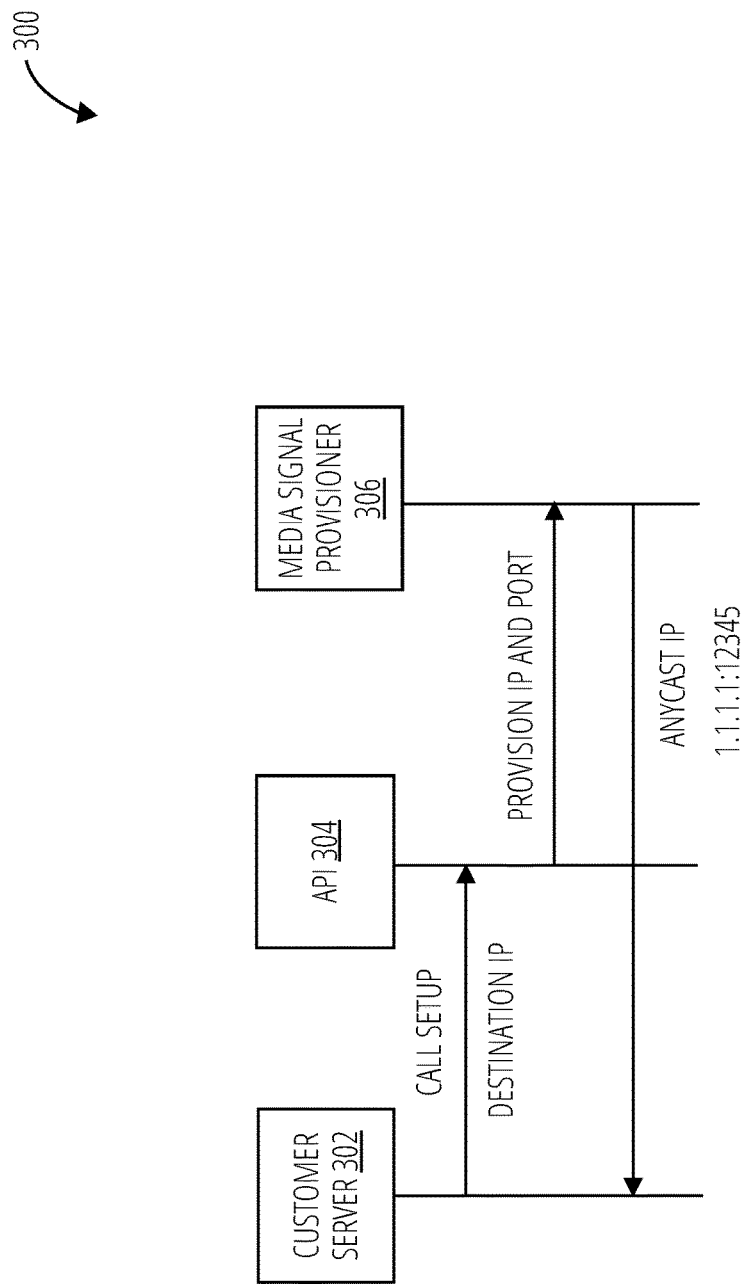
FIG. 3 illustrates an embodiment of a provision action flow 300.

Referring to FIG. 3, the provision action flow 300 comprises a customer server 302, an application 304, and a media signal provisioner 306.

The customer server 302, which may be a media source 102 or media destination 104, send a call setup signal to the application 304. The application 304 sends the setup signal to the media signal provisioner 306 as well as the IP address and port of the media source 102 or media destination 104. The media signal provisioner 306 in response sends the provision signal, which includes the anycast IP (1.1.1.1: 12345) to the customer server 302.

Figure 4:
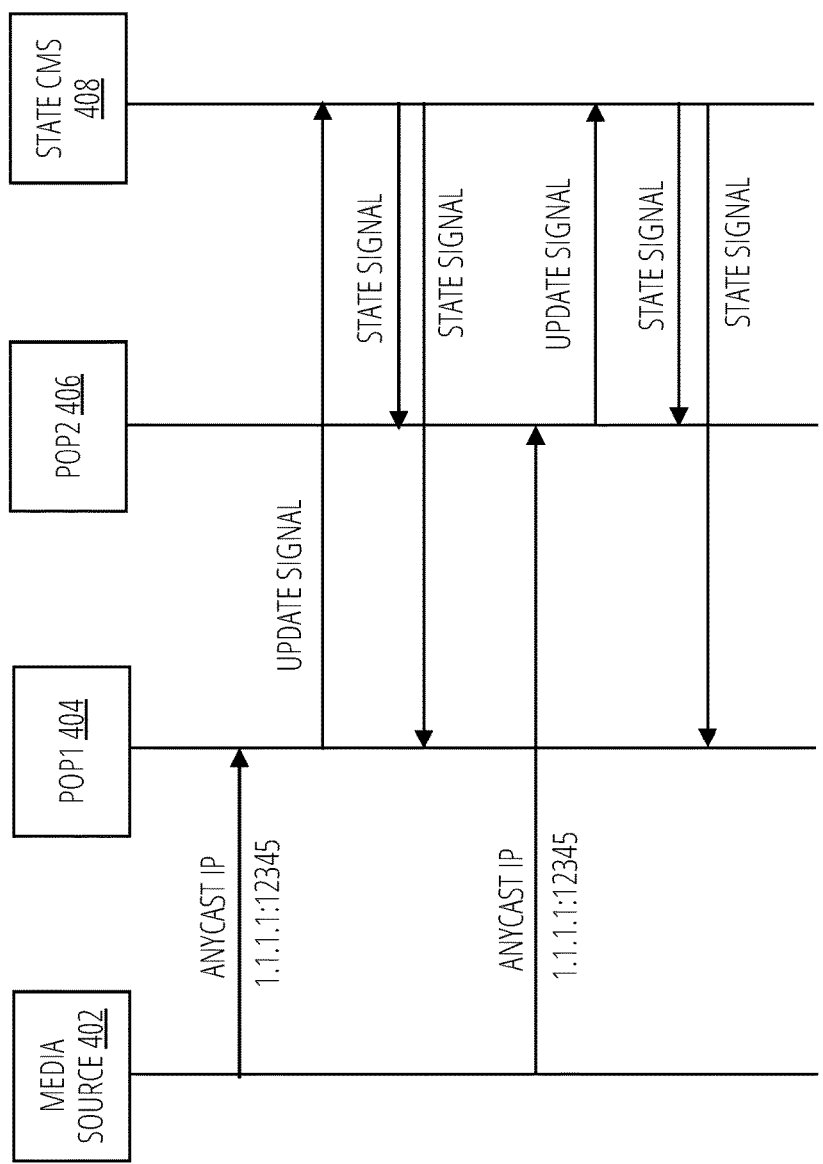
FIG. 4 illustrates an embodiment of a uni-directional media signal action flow 400.

Referring to FIG. 4, the uni-directional media signal action flow 400 comprises a media source 402, a first media signal receiver 404, a second media signal receiver 406, and a state control memory structure 408.

The media source 402 sends the media signal to the first media signal receiver 404 utilizing the anycast IP. The first media signal receiver 404 then sends an update signal to the state control memory structure 408. The update signal may comprise identifying information and an association. The new state is then sent to each media signal receiver, such as the first media signal receiver 404 and the second media signal receiver 406, as a state signal.

At a later time, the media source 402 sends the media signal to the second media signal receiver 406 instead of the first media signal receiver 404. The second media signal receiver 406 then sends an update signal to the state control memory structure 408. The update signal may comprise a new association based on the media signal being received at a different media signal receiver. The new state is then sent to each media signal receiver, such as the first media signal receiver 404 and the second media signal receiver 406, as a state signal.

Figure 5:
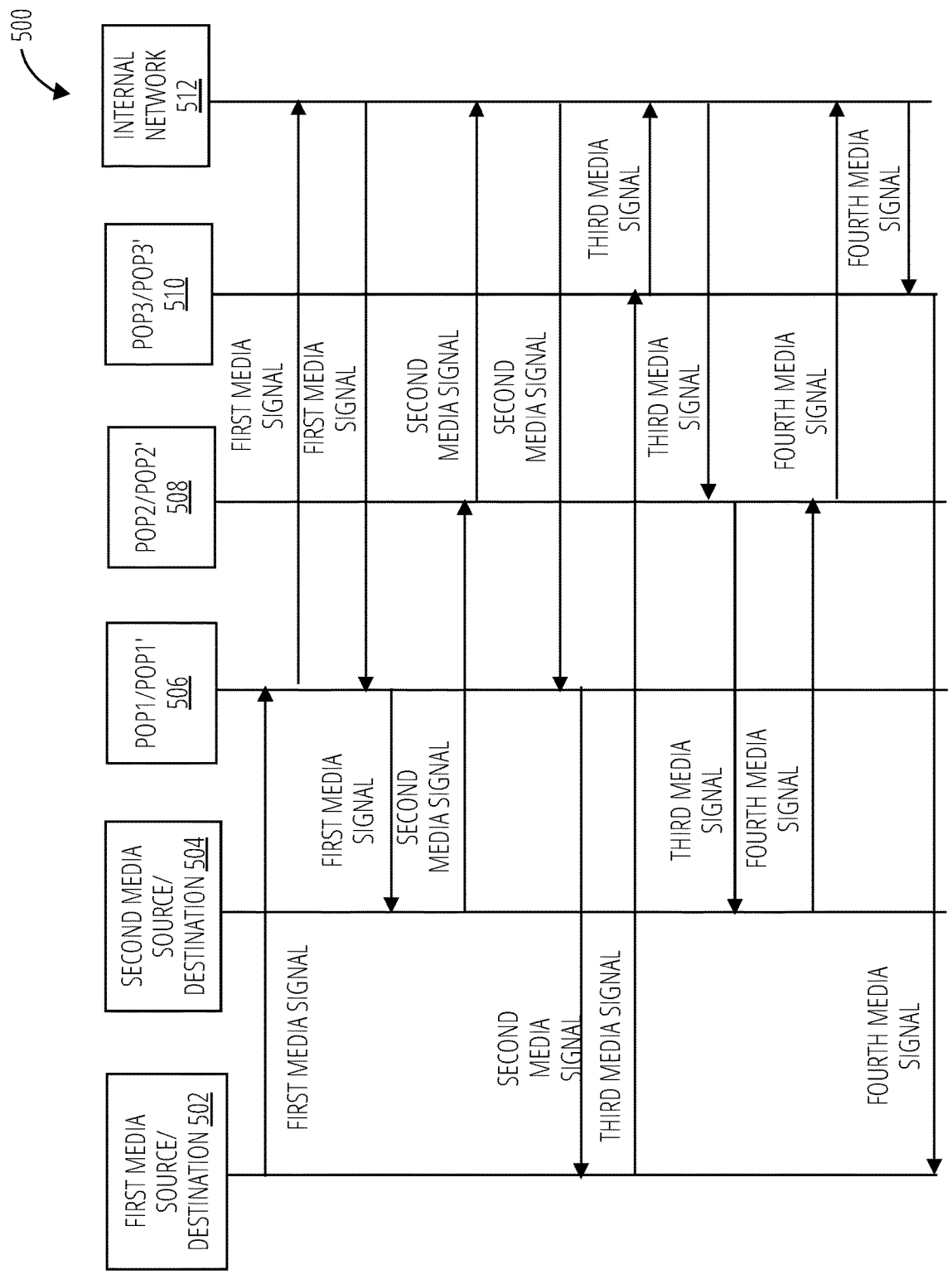
FIG. 5 illustrates an embodiment of a bi-directional media signal action flow 500.

Referring to FIG. 5, the bi-directional media signal action flow 500 comprises a first media source/destination 502, a second media source/destination 504, a first media signal receiver/sender 506, a second media signal receiver/sender 508, a third media signal receiver/sender 510, and an internal network 512.

The first media source/destination 502 sends a first media signal to the first media signal receiver/sender 506. As depicted in FIG. 4, the state is stored. The first media signal receiver/sender 506 send the first media signal to the internal network 512. The internal network 512 selects a media signal sender to send to the second media source/destination 504 as the second media source/destination 504 has not previously sent a media signal. In some embodiments, the selection may be performed by the first media signal receiver/sender 506 or another component. As depicted the internal network 512 sends the first media signal to the first media signal receiver/sender 506, which sends the first media signal to the second media source/destination 504.

The second media source/destination 504 is now acting as a media source 102 and sends the second media signal to the second media signal receiver/sender 508 utilizing anycast. The state is then updated with the new association. The second media signal receiver/sender 508 sends the second media signal to the internal network 512. As the state is such that the first media source/destination 502 is associated with the first media signal receiver/sender 506, the internal network 512 sends the second media signal to the first media signal receiver/sender 506, which sends the second media signal to the first media source/destination 502.

At a later time, the first media source/destination 502 sends a third media signal to the third media signal receiver/sender 510, which alters the stated (i.e., the association) as previously the first media source/destination 502 sent to the first media signal receiver/sender 506. The third media signal receiver/sender 510 then sends the third media signal to the internal network 512. The internal network 512 sends the third media signal to the second media signal receiver/sender 508, which sends the third media signal to the second media source/destination 504.

Finally, the second media source/destination 504 sends a fourth media signal to the second media signal receiver/sender 508, which sends the fourth media signal to the internal network 512. With the updated state, the internal network 512 sends the fourth media signal to the third media signal receiver/sender 510, which sends the fourth media signal to the first media source/destination 502.

Referring to FIG. 6, the media signal transmitting process 600 receives a media signal from a media source at a media signal receiver (block 602). The media signal sender selection method 700 determines whether there is a state change (decision block 604). The state change is receiving a media signal from a media source at a media signal receiver that is different than that which is stored as an association (e.g., in a state control memory structure). A state change may also occur upon first receiving a media signal from a media source. If there is a state change, an update control is sent to a state control memory structure (block 606). The update control may include identifying information for the media source and media destination, as well as an association for the media source and the media signal receiver. The new state is sent to the one or more media signal receivers (block 608). The state may be sent in response to a query control from a media signal receiver or may be sent in response to receiving the update control. If there is no state change or the new state has been sent, a media signal sender is selected from the one or more media signal transmitters (media signal sender selection method 700). The media signal sender selection method 700 is depicted in FIG. 7. The media signal is sent to the selected media signal sender via the internal network (block 610). The media signal is then sent to the media destination (block 612).

Referring to FIG. 7, the media signal sender selection method 700 determines whether there is identifying information and an association for the media destination (decision block 702). The identifying information and association may be stored in a state control memory structure or media signal receiver as the current state. The media destination may have previously been a media source and provided the identifying information and association. If so, the media signal sender associated with the association is selected (block 704). If not, an alternate selection is determined (block 706). Many selection methods may be stored to be utilized, such as random selection or weighted variable selection. If random selection is utilized (decision block 708), the media signal sender selection method 700 selects one of the one or more media signal transmitters to be the media signal sender. If weighted variable selection is utilized (decision block 712), the weights are determined (block 710). The determination of weights refers to emphasizing the contribution of some aspects of a set of data to a final effect or result, giving them more weight in the analysis. Some data may be adjusted to contribute more than others. The weights may include location, IP address, media signal characteristics, status of networks associated with the media destination and media signal sender, etc. The media signal sender is then selected based on the weights and the state of the variables (block 716). If neither random selection nor weighted variables are utilized, the media signal sender associated with the media signal receiver that received the media signal is selected (block 718). Once the selection is made, the media signal sender selection method 700 ends (done block 720).

Referring to FIG. 8, a method 800 comprises a first virtual machine (one of a plurality of instances) with the same IP address receiving traffic (block 802). A second virtual machine starts receiving the traffic that was originally routed to the first virtual machine (block 804). The second virtual machine generates a state change event notifying the system that it is now receiving the traffic for which it was provisioned (block 806). Next, a check network step is performed to see if many calls are being routed to the second virtual machine instead of the intended first virtual machine (block 808). The number of rerouted calls that may indicate a problem may be determined by past performance on a route (e.g., typically only 1 or 2 calls are rerouted in a day on this route). On other routes an increasing number of rerouted calls over a short period of time may indicate a problem.

In an embodiment, a virtual machine with an IP address is copied in a plurality of different geographic regions. If one of the virtual machines was receiving traffic and then suddenly, a different one starts receiving that traffic then the different virtual machine that was listening but not getting the traffic will generate a state change event notifying the system that with respect to transmissions provisioned for but not being received, the different virtual machine just received traffic for it. The network may be checked to determine if many data transmissions are being rerouted to the different virtual machine instead of the original destination virtual machine. This excessive traffic rerouting, identified by the state change events, may indicate a problem with the network that should be further investigated.

Figure 9:
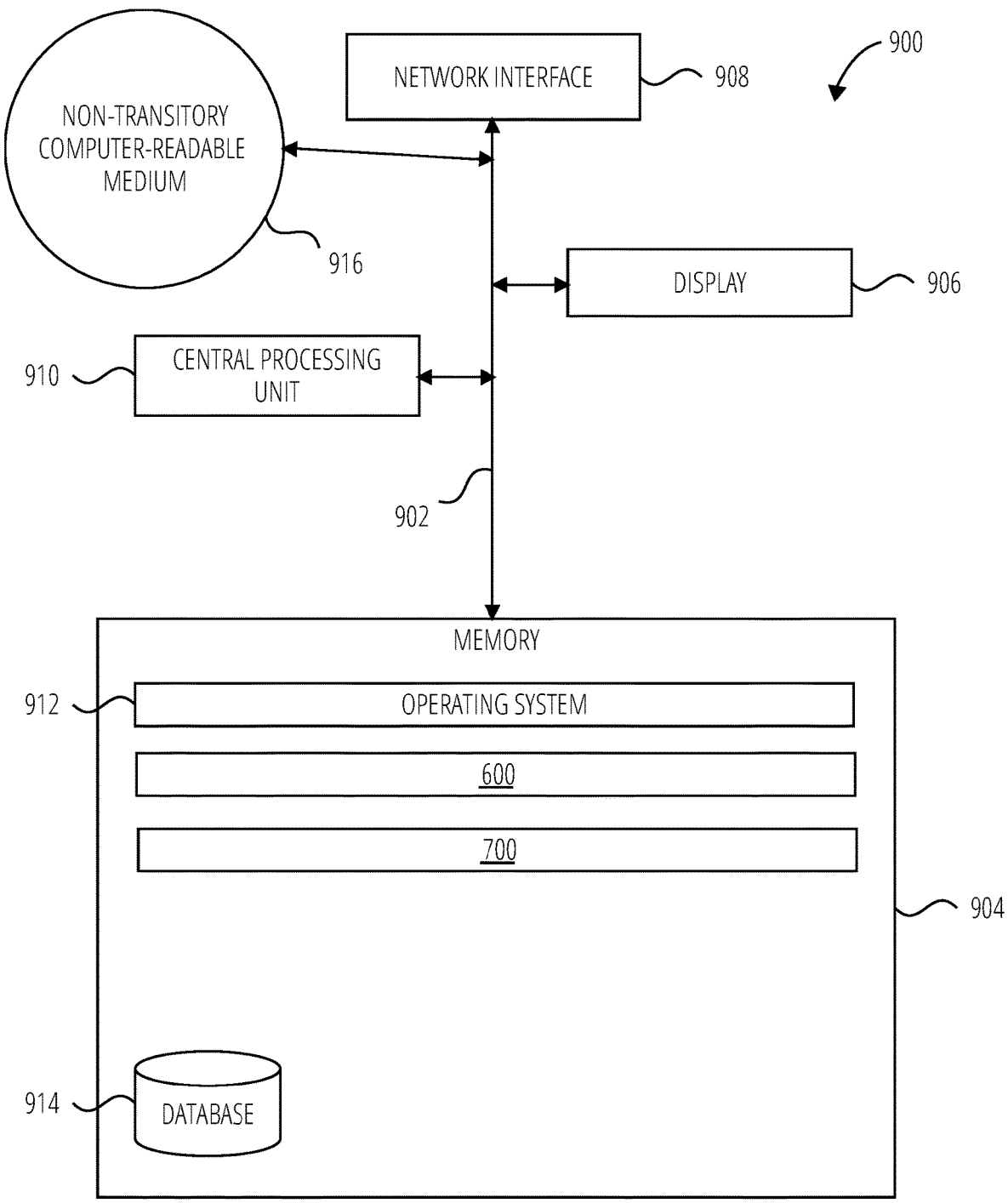
FIG. 9 illustrates a system 900 in accordance with one embodiment.

FIG. 9 illustrates several components of an exemplary system 900 in accordance with one embodiment. In various embodiments, system 900 may include a desktop PC, server, workstation, mobile phone, laptop, tablet, set-top box, appliance, or other computing device or apparatus that is capable of performing operations such as those described herein. In some embodiments, system 900 may include many more components than those shown in FIG. 9. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 900 may comprise one or more physical and/or logical devices that collectively provide the functionalities described herein. In some embodiments, system 900 may comprise one or more replicated and/or distributed physical or logical devices.

In some embodiments, system 900 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 900 includes a bus 902 interconnecting several components including a network interface 908, a display 906, a central processing unit 910, and a memory 904.

Memory 904 generally comprises a random access memory ("RAM") and permanent non-transitory mass storage device, such as a hard disk drive or solid-state drive. Memory 904 stores an operating system 912.

These and other software components may be loaded into memory 904 of system 900 using a drive mechanism (not shown) associated with a non-transitory computer-readable medium 916, such as a DVD/CD-ROM drive, memory card, network download, or the like.

Memory 904 also includes database 914. In some embodiments, system 900 may communicate with database 914 via network interface 908, a storage area network ("SAN"), a high-speed serial bus, and/or via the other suitable communication technology.

In some embodiments, database 914 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Terms used herein should be accorded their ordinary meaning in the relevant arts, or the meaning indicated by their use in context, but if an express definition is provided, that meaning controls.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

What is claimed is:

1. A virtual border controller comprising:
   a first interface comprising a plurality of first points of presence to a data communication network;
   a second interface comprising a plurality of second points of presence to the data communication network;
   an anycast address provisioner operable to:
      configure an assignment of a first anycast IP address for data communication between a media source device and the data communication network;
      configure an assignment of a second anycast IP address for data communication between a media destination device and the data communication network;
      configure an assignment of a first one of the first points of presence to communicate with the media source device using the first anycast IP address; and
      configure an assignment of a first one of the second points of presence to communicate with the media destination device using the second anycast IP address;
   a state controller; and
   logic configured to respond to a misdirection of the data communication by the media source device to a second one of the first points of presence by:
      signaling an indication of the misdirection from the second one of the first points of presence to the state controller;
      changing the assignment of the first one of the first points of presence for the data communication between the media source device and the data communication network using the first anycast IP address to an assignment of the second one of the first points of presence for the data communication between the media source device and the data communication network using the first anycast IP address; and
      signaling from the state controller to each one of the first points of presence of the assignment of the second one of the first points of presence for the data communication between the media source device and the data communication network using the first anycast IP address.

2. The virtual border controller of claim 1, further comprising, in response to the misdirection of the data communication by the media source device to the second one of the first points of presence:
   the second one of the first points of presence communicating with the state controller to receive a current stored state comprising the assignment of the first one of the first points of presence to communicate with the media source device using the first anycast IP address;
   the second one of the first points of presence detecting a state change by comparing the current stored state to a state in which the second one of the first points of presence is assigned for the data communication between the media source device and the data communication network using the first anycast IP address; and
   the second one of the first points of presence signaling the indication of the misdirection from the second one of the first points of presence to the state controller in response to detecting the state change.

3. The virtual border controller of claim 1, further comprising:
   the plurality of first points of presence to the data communication network comprising a first plurality of virtual machines each assigned to the first anycast IP address;
   the first one of the first points of presence for the data communication between the media source device and the data communication network comprising a first virtual machine of the first plurality of virtual machines;

the second one of the first points of presence for the data communication between the media source device and the data communication network comprising a second virtual machine of the first plurality of virtual machines; and the logic to respond to the misdirection of the data communication by the media source device to the second one of the first points of presence further configured to:

check a number of data communications misrouted to the second virtual machine instead of the first virtual machine; and indicating a routing problem in the network based on the number.

4. The virtual border controller of claim 1 further comprising logic configured to respond to a misdirection of the data communication by the media destination device to a second one of the second points of presence by:

signaling an indication of the misdirection from the second one of the second points of presence to the state controller;

changing the assignment of the first one of the second points of presence for the data communication between the media destination device and the data communication network using the second anycast IP address to an assignment of the second one of the second points of presence for the data communication between the media destination device and the data communication network using the second anycast IP address; and signaling from the state controller to each one of the second points of presence of the assignment of the second one of the second points of presence for the data communication between the media destination device and the data communication network using the second anycast IP address.

5. The virtual border controller of claim 4, further comprising:

the plurality of second points of presence to the data communication network comprising a second plurality of virtual machines each assigned to the second anycast IP address;

the first one of the second points of presence for the data communication between the media destination device and the data communication network comprising a first virtual machine of the second plurality of virtual machines;

the second one of the second points of presence for the data communication between the media destination device and the data communication network comprising a second virtual machine of the second plurality of virtual machines; and the logic to respond to the misdirection of the data communication by the media destination device to the second one of the second points of presence further configured to:

check a number of data communications misrouted to the second virtual machine instead of the first virtual machine; and indicating a routing problem in the network based on the number.

6. The virtual border controller of claim 4, further comprising, in response to the misdirection of the data communication by the media destination device to the second one of the second points of presence:

the second one of the second points of presence communicating with the state controller to receive a current stored state comprising the assignment of the first one of the second points of presence to communicate with the media destination device using the second anycast IP address;

the second one of the second points of presence detecting a state change by comparing the current stored state to a state in which the second one of the second points of presence is assigned for the data communication between the media destination device and the data communication network using the second anycast IP address; and the second one of the second points of presence signaling the indication of the misdirection from the second one of the second points of presence to the state controller in response to detecting the state change.

* * * * *